Sept. 23, 1969 H. B. SHAPER 3,469,040

VARIABLE RELUCTANCE PHONOGRAPH CARTRIDGE

Filed April 15, 1965 3 Sheets-Sheet 1

INVENTOR
HARRY B. SHAPER

BY

OSTROLENK, FABER, GERB & SOFFEN

ATTORNEYS

Sept. 23, 1969 H. B. SHAPER 3,469,040

VARIABLE RELUCTANCE PHONOGRAPH CARTRIDGE

Filed April 15, 1965 3 Sheets-Sheet 2

INVENTOR
HARRY B. SHAPER

By

OSTROLENK, FABER, GERB & SOFFEN
ATTORNEYS

VARIABLE RELUCTANCE PHONOGRAPH CARTRIDGE

Filed April 15, 1965 3 Sheets-Sheet 3

INVENTOR
HARRY B. SHAPER
BY
OSTROLENK, FABER, GERB & SOFFEN
ATTORNEYS

United States Patent Office 3,469,040

Patented Sept. 23, 1969

3,469,040

VARIABLE RELUCTANCE PHONOGRAPH CARTRIDGE

Harry B. Shaper, East Hills, N.Y., assignor to Empire Scientific Corporation, Garden City, N.Y., a corporation of New York Filed Apr. 15, 1965, Ser. No. 448,369
Int. Cl. H04r *19/06*
U.S. Cl. 179—100.41 25 Claims

ABSTRACT OF THE DISCLOSURE

A stereophonic magnetic phonograph pickup is constructed with two magnetic circuits having a common gap positioned at the rear end of a pivotable armature. Another gap, positioned at the front end of the armature, is formed between the armature and a housing common to both magnetic circuits. The armature includes a forward cylindrical section and a rear conical section with a stylus lever connected to the cylindrical section and an elastomeric damping means surrounding the cylindrical section.

This invention relates to phonograph pickup cartridges for the reproduction of stereophonic signals recorded in a single groove and in particular relates to improvements over the magnetic type stereophonic phonograph pickups illustrated in U.S. Patents Nos. 2,875,282 and 3,077,522.

In order to achieve high fidelity reproduction of signals recorded in the spiralled sound groove of a stereophonic disk type phonograph record it has been found that, in general, such phonograph pickup cartridge should operate with a low tracking force, should have high stylus compliance, especially when both channels are recorded in a single groove, it is necessary that the pickup achieve good channel separation or low cross-talk. It is further required that there be no magnetic attraction to steel members in the vicinity of the pickup and that the pickup be constructed so that there is freedom from hum generated externally of the pickup. Phonograph cartridges of the prior art have achieved the foregoing objectives in varying degrees, but not to the overall extent achieved by the construction of the invention to be hereinafter described.

The phonograph pickup of the instant invention, as the devices of the aforesaid Patents 2,875,282 and 3,077,522, each operates on the principles of a changing magnetic field. That is, undulations cut in the record sound groove cause a stylus supporting shoe to swing from side to side thereby moving an armature attached to the shoe. This armature is an element positioned in a single air gap common to two magnetic circuits having a common source of flux. Coils coupled to each of the magnetic circuits pick up flux changes which occur as a result of armature movement causing flux changes in the common gap. The direction of armature movement determines whether signals are generated in the coils of one or both of the magnetic circuits with the magnitude of movement determining the amplitude of the signals. Armature movement is so directed that armature components of motion derived from one recording channel produce an output from only one of the magnetic circuits while armature components of motion derived from the other recording channel produce an output from only the other of the magnetic circuits.

In order to achieve freedom from hum pickup the pickup cartridge of the instant invention is provided with a mu-metal housing which forms parts of the magnetic circuits and encloses the coils, pole pieces to which the coils are mounted, and air gaps in the magnetic circuits formed between the pole pieces and armature.

The armature of the instant invention is a tubular member of generally cylindrical form mounted to one end of a cantilever spring whose other end is fixedly mounted. The spring extends generally along the cylindrical axis of the armature and the effective securement point is located near the end of the armature remote from the fixed securement point for the spring. An elastomeric damping member engages the armature near the end thereof remote from the fixed securement point of the spring and the outer surface of the armature is tapered downward toward the fixed securement point of the spring.

This tapered portion of the armature is positioned in the gap between the faces of the pole pieces in spaced relation with respect thereto and enables relatively large angular movement of the armature while permitting relatively small gap length during quiescent conditions thereby tending to increase output for given armature motion. Tapering of the armature reduces dynamic mass of the moving system thereby improving compliance and, as will hereinafter become apparent, flux density along the gap can be made nearly constant by adjusting the rate of taper thereby improving fidelity of reproduction. It is noted that in some prior art devices an attempt to reduce the dynamic mass in the moving system by reducing the wall thickness of a tubular armature required operation at low flux densities to avoid saturation with low flux density operation resulting in low output.

The taper of the armature in the device of the instant invention is done in conjunction with a constant bore size of the tube so that portions of the wall thickness are reduced. However, the positioning of the thin wall portion relative to the thicker wall portions of the armature assures that flux saturation will not take place in that those armature areas which must carry the greater flux are of greater cross sectional area.

The construction of the phonograph pickup constituting the instant invention enables simplified manufacturing procedures in that the armature is a hollow cylindrical member rather than being of rectangular cross section so that the formation of a tapered section is relatively simple. Further, the tapered section is located in a circular air gap defined by arcuate pole faces. This circular gap is much more readily obtained than is a gap of almost any other shape since a circular opening may be formed by a simple boring operation.

Accordingly, a primary object of the instant invention is to provide a novel construction for a phonograph pickup of the magnetic type.

Another object is to provide a phonograph pickup having improved operating characteristics especially in the areas of compliance over a wide frequency range, low tracking force, good channel separation and freedom from external disturbances.

Still another object is to provide a phonograph pickup of this type whose construction is such that manufacturing procedures are relatively simple.

A further object is to provide a phonograph pickup of this type in which the armature is a tubular member having a tapered portion positioned in a common gap defined by a plurality of pole faces from different magnetic paths.

A still further object is to provide a phonograph pickup of this type in which the armature is a hollow cylinder having a tapered wall portion positioned in a circular gap defined by arcuate pole faces.

These as well as further objects of this invention will become readily apparent after reading the following description of the accompanying drawings in which.

Figures 1, 2, 3, 4, 5, 6, 7:
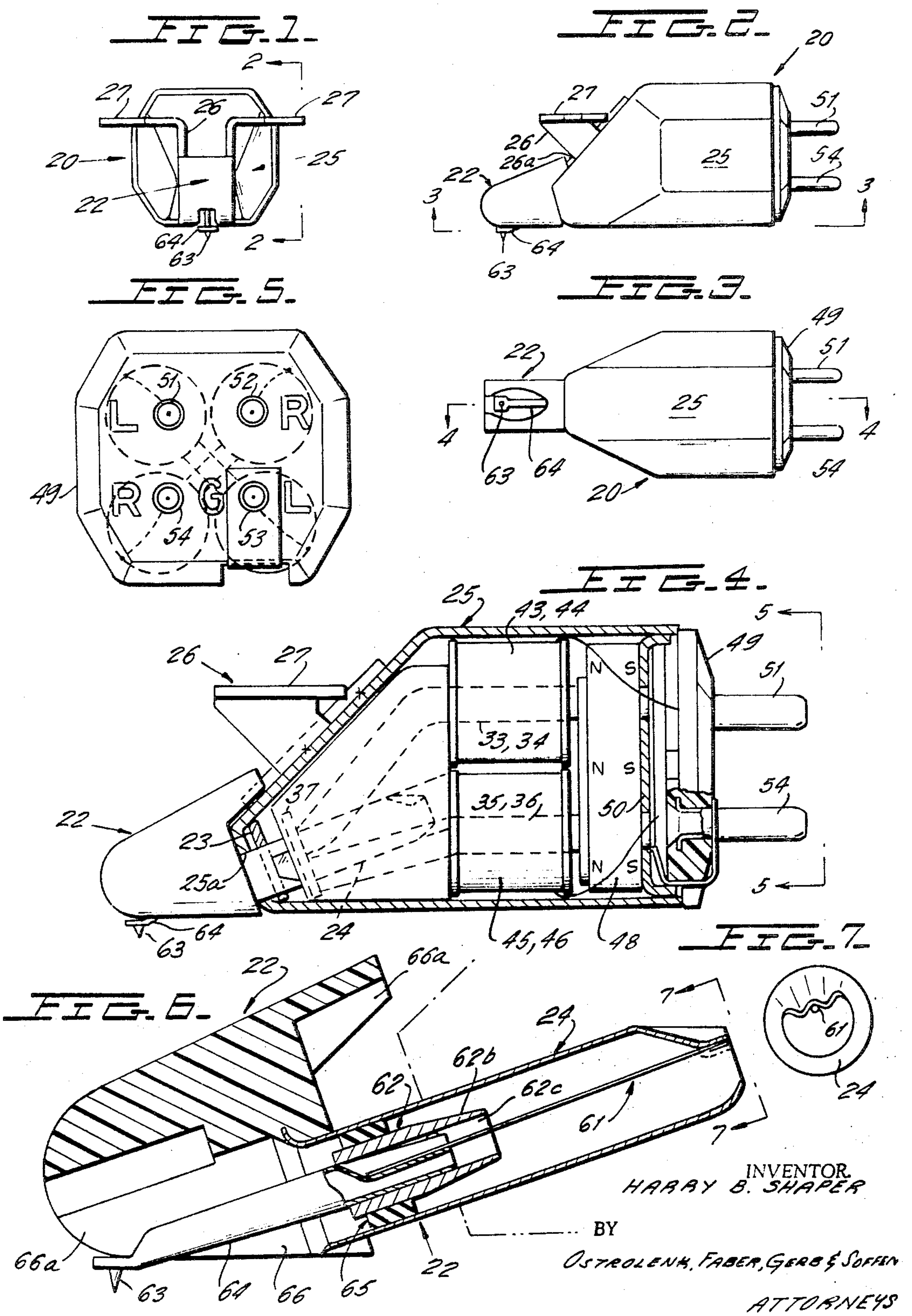
FIGURE 1 is a front elevation of a phonograph pickup cartridge constructed in accordance with the teachings of the instant invention.
FIGURE 2 is a side elevation looking in the direction of arrows 2—2 of FIGURE 1.
FIGURE 3 is a bottom view looking in the direction of arrows 3—3 of FIGURE 2.
FIGURE 4 is an enlarged longitudinal cross section taken through line 4—4 of FIGURE 3 looking in the direction of arrows 4—4.
FIGURE 5 is a rear elevation looking in the direction of arrows 5—5 of FIGURE 4.
FIGURE 6 is an enlarged longitudinal cross section of the removable and replaceable stylus assembly of the phonograph pickup illustrated in FIGURES 1 through 5.
FIGURE 7 is a rear view of the stylus assembly sleeve looking in the direction of arrows 7—7 of FIGURE 6.

Now referring to the figures. Stereophonic phonograph pickup 20 consists of main assembly 21, indicated by the bracketed elements in FIGURE 17, and removable and replaceable stylus assembly 22 (FIGURE 6) held together by member 23 (FIGURES 4 and 17) which frictionally engages the outer surface of stylus assembly sleeve 24. Member 23 is preferably constructed of nylon.

Main assembly 21 includes mu-metal housing 25 having bracket 26 welded to the sloping forward portion of its upper surface. Outwardly extending wings 27 of bracket 26 are provided with slots which receive screws for the mounting of pickup 20 to a tone arm (not shown) in a manner well known to the art.

Friction retaining member 23 is disposed within housing 25 at the forward end thereof with circular aperture 23*a* of member 23 being in alignment with circular aperture 25*a* in the rearwardly sloping surface at the front of housing 25. Pole piece sub-assembly 30 is disposed within housing 25 with the forward projections 31*a*, 31*b* of molded plastic support member 31 engaging retaining member 23. Cylindrical bore 32 extending through support 31 is aligned with apertures 23*a* and 25*a* so as to receive sleeve 24.

The forward portions of rod-like pole pieces 33, 34, 35 and 36 are partially formed and frame 37 is totally, encapsulated by support 31. Prior to the encapsulation the forward ends of pole pieces 33 through 36 are secured, as by welding, to frame 37 at the arcuate enlargements in the corners of a generally square aperture 37*a* in frame 37. Frame 37 is constructed of low permeability material such as stainless steel so that for practical purposes it will not have any magnetic influence on the overall structure. Coils 43, 44, 45, 46 are mounted to the rear ends of pole pieces 33, 34, 35, 36, respectively.

Figures 17, 18, 19:
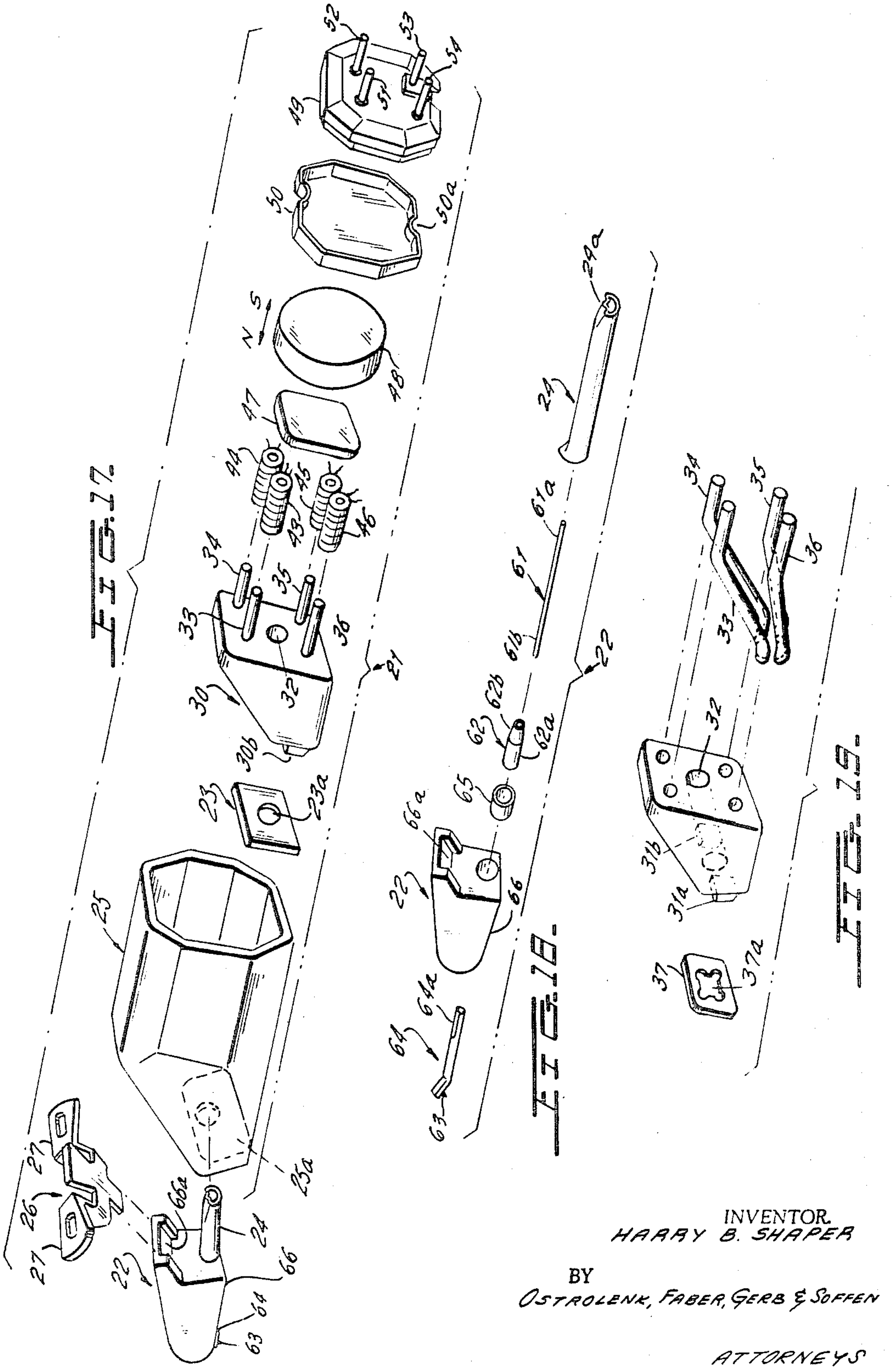
FIGURE 17 is an exploded perspective of the main elements constituting the phonograph pickup cartridge of FIGURES 1 through 5.
FIGURE 18 is an exploded perspective of the removable and replaceable stylus assembly of FIGURE 6.
FIGURE 19 is an exploded perspective of the pole piece assembly of FIGURE 9.

Magnetic shunt plate 47, having one surface abutting the rear ends of pole pieces 33 through 36, is positioned with the other surface thereof abutting a surface of disk-like permanent magnet 48 which is axially magnetized as indicated in FIGURES 4 and 17. Member 50, constituting the rear cover for housing 25 is constructed of a material having high magnetic permeability. Plastic molded member 49, having male terminals 51, 52, 53, 54 embedded therein and protruding from the rear thereof, is mounted to the rear of cover 50. Cover 50 abuts the rear surface of magnet 48 and is provided with notches 50*a* for the passage of leads (not shown) from coils 43 through 46 to terminals 51 through 54. The particular electrical connections between coils 43 through 46 are made in a manner well known to the art and does not constitute a feature of the instant invention so that a detailed description thereof is not given herein.

It is noted that when viewing FIGURE 4 certain elements of main assembly 21 appear to be floating. In such instances these members are secured to adjacent members as by epoxy cement. Cover 50 is welded to housing 25 while cement is also utilized to secure member 49 and other elements to be hereinafter described to one another.

Removable stylus assembly 22, as best seen in FIGURES 6 and 18, includes wire spring 61 which acts as a cantilever support for armature 62. Spring 61 extends generally longitudinally of sleeve 24 and is disposed therein with the rear end 61*a* of spring 61 being cemented to the inwardly extending deformation 24*a* at the rear of sleeve 24. Stylus 63 is mounted to the off-set portion at the forward end of tubular lever 64 whose rear end, of lever 64 containing inwardly projecting formation 64*a*, extends into the forward end of bore 62*c* through tubular cylindrical armature 62. The forward end 61*b* of spring 61 extends into the rear end of the armature bore 62*c* and is is cemented to lever 64 at formation 64*a*. Spring 61, lever 64 and sleeve 24 are constructed of material such as brass and aluminum, having low magnetic permeability while armature 62 is constructed of material having exceptionally high magnetic permeability.

The forward section 62*a* of armature 62 is of uniform outer diameter while the outer diameter of rear section 62*b* is tapered inwardly and to the rear for a reason to be hereinafter explained. Armature bore 62*c* is of uniform diameter throughout its length so that the wall thickness of armature 62 is tapered at the rear section 62*b*. Elastomeric damping ring 65 surrounds armature 62 and is in engagement with the outer surface of portion 62*a* and the inner surface of sleeve 24. Plastic bridge 66 is molded with sleeve 24 partially embedded therein and is provided with clearance notch 66*a* forward of sleeve 24. Lever 64 extends through notch 66*a* with the offset forward end of lever 64 protruding out the bottom of lever 66*a* to enable stylus 63 to engage a phonograph.

Figure 13:
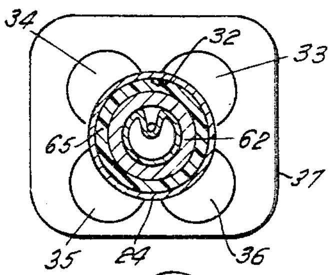
FIGURE 13 is an enlarged view looking in the direction of arrows 12—12 of FIGURE 9 showing the relationship between the armature and pole faces when the removable stylus assembly is in operating position.
Figure 15:
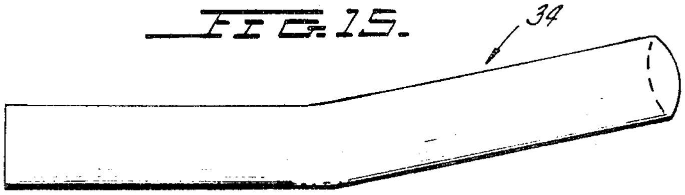
FIGURE 15 is a plan view of a pole piece of FIGURE 14.
Figure 16:
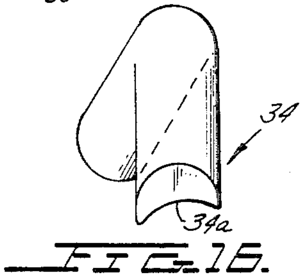
FIGURE 16 is a front elevation of the pole piece of FIGURE 14 looking in the direction of arrows 16—16 of FIGURE 14.

As best seen in FIGURE 13, with stylus assembly 22 mounted to main assembly 21 the outer surface of sleeve 24 is adjacent to the arcuate pole faces at the forward ends of pole pieces 33 through 36. However, a friction fit between sleeve 24 and the wall defining bore 32 is not relied upon for securing stylus assembly 22 to main assembly 21. Instead bracket 26 is provided with forwardly extending downwind projection 26*a* which is force fitted into rectangular notch 66*a* of bridge 66. Projection 26*a* and notch 66*a* cooperate to correctly position stylus 63 with respect to pole pieces 33 through 36.

With stylus assembly 22 mounted to main assembly 21 the housing portion defining housing aperture 25*a* surrounds the forward portion 62*a* of armature 62, and the arcuate faces at the forward ends of pole peices 33 through 36 are positioned in a circular array surrounding the tapered portion 62*b* at the rear of armature 62. Thus, a forward gap is formed in the magnetic path between the forward end 62*a* of armature 62 and the portion of housing 25 closest thereto while rear gaps in the magnetic paths between armature 62 and magnet 48 are formed between the tapered rear portion 62*b* of armature 62 and the arcuate pole faces of pole members 33 through 36.

Figures 14, 16A:
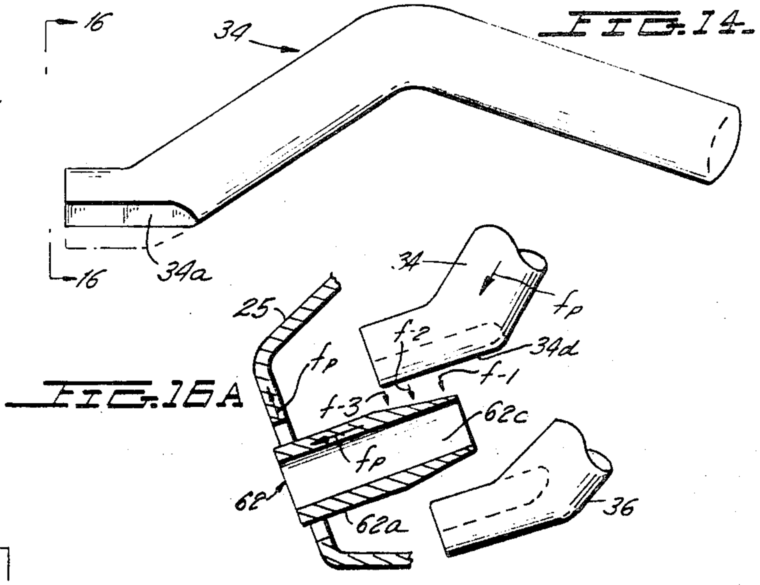
FIGURE 14 is a side elevation of one of the pole faces.
FIGURE 16A is a partial longitudinal cross section showing the relationship between the pole pieces of one reproduction channel, the armature, and the housing portion closest to the armature.
Figure 8:
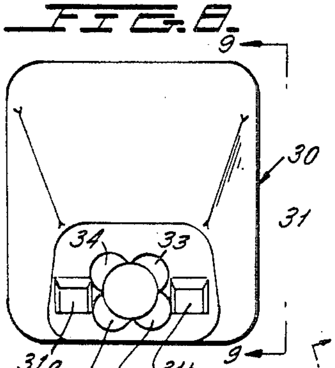
FIGURE 8 is a front elevation of the pole pieces assembled and partially enclosed by an encapsulating member.
Figure 9:
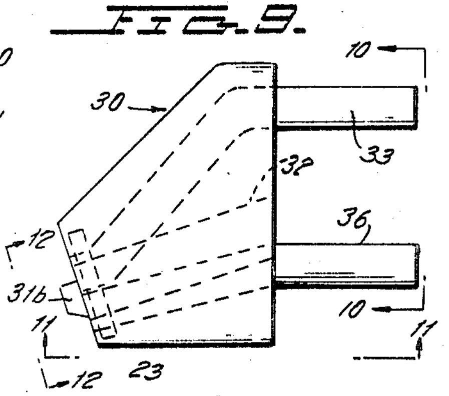
FIGURE 9 is a side elevation looking in the direction of arrows 9—9 of FIGURE 8.
Figure 10:
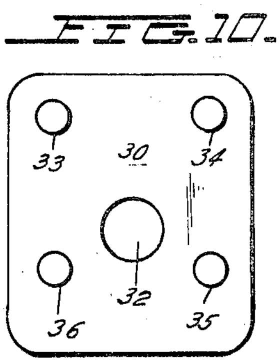
FIGURE 10 is a rear elevation looking in the direction of arrows 10—10 of FIGURE 9.
Figure 12:
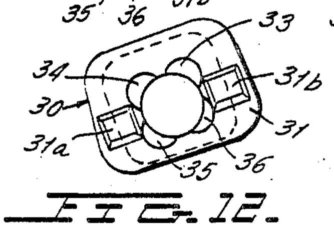
FIGURE 12 is a partial front elevation looking in the direction of arrows 12—12 of FIGURE 9.
Figure 11:
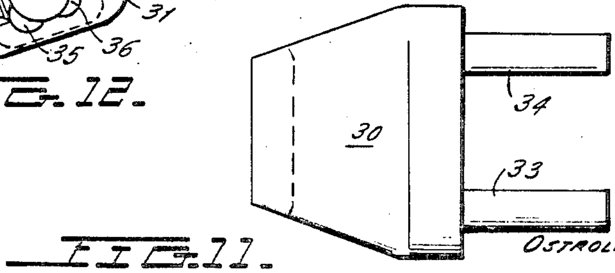
FIGURE 11 is a bottom elevation looking in the direction of arrows 11—11 of FIGURE 9.

With stylus 63 in the groove of a rotating stereophonic phonograph record the groove formations drive lever 64 causing armature 62 to oscillate while supported by spring 61. By tapering the outer surface of armature 62 at the rear thereof the mass of armature 62 is reduced and increased angular movement for armature 62 is permitted without engaging sleeve 24 even though under quiescent conditions armature 62 is closely spaced with respect to the inner surface of sleeve 24. Even though the wall thickness at the rear of armature 62 is reduced, saturation will not take place since the more rearwardly portions of the tapered section 62*b* are not required to carry as much flux as the more forwardly portions of tapered sections 62*b*. That is, armature 62 constitutes the low permeability portion of the flux path between housing 25 and the arcuate face of pole piece 33 (see FIGURE 16A). Flux *f*–1 passing through the gap at the rear portion of the arcuate pole face 34*a* enters armature 62 at the narrowest portion thereof and travels the path length of the tapered section 62*b*. Flux *f*–3 passing through the gap between the forwardmost portion of pole face 34*a* and armature 62 enters at the thickened portion of the tapered section 62*b* and moves in a path extending forwardly rather than toward the narrow section at the rear. Similarly, flux *f*–2, passing through the gap at a location between fluxes *f*–1 and *f*–3, enters armature 62 at the mid-region of tapered section 62*b* and also moves forwardly.

Thus, it is seen that the total flux *fp* of pole piece 34 consists of fluxes *f*–1, *f*–2 and *f*–3 each passing through the gap between pole face 34*a* and tapered armature portion 62*b*. After passing through the air gap these fluxes recombine at the forward end 62*a* of armature 62 and then pass through the forward gap to housing 25 for return through cover 50 to the south pole face of magnet 48. The same type of flux flow takes place through the gaps between the other arcuate pole faces and armature 62.

As should now be apparent to those skilled in the art, pickup 20 is constructed to reproduce stereophonic recordings made by the Westrex 45–45 system. Rods 33 and 35 are in the magnetic circuit of one playback channel while rods 34 and 36 are in the magnetic circuit of the other playback channel. It is noted that the gap distance (radial spacing) between the arcuate faces of rods 33 and 35 is equal to the gap distance between the arcuate faces of the other rods 34 and 36. Further, the gap length (measured along the axis of armature 62) is the same for the gaps between the pole faces of rods 33 and 35 as well as between the pole faces of rods 34 and 36. Since these gaps occupy the same axial position they are said to be coextensive, and are also said to be common to both reproduction channels.

It appears that by controlling the rate of taper at rear armature section 62*b* linearity of response may be controlled. It also appears that by placing the spring support for armature 62 substantially along the longitudinal axis thereof at a point considerably forward of the rear end of armature 62, additional improvement in linearity of response and improved compliance are obtained.

It is noted that the arcuate pole face 34*a* of pole piece 34 (FIGURES 13 through 16) may be formed at the time rod constituting pole piece 34 is bent into shape. However, it is a simple matter to attain accurate alignment between all of the arcuate pole faces by forming them subsequent to mounting of pole pieces 33 through 36 to frame 37 and thereafter utilizing a circular drill. This drilling operation may take place either prior or subsequent to the formation of support member 31.

Thus, this invention provides a simplified and novel construction for a magnetic type phonograph pickup in which the armature is provided with a conical section. Because of this, increased output is obtained in that freedom of angular movement is achieved without interference while operating with small air gaps. Improved linearity is obtained by controlling the rate of taper of the conical surface and improved compliance is obtained by the novel manner in which the armature is mounted to a cantilever spring support.

It is noted that the term "gap" refers to a portion of a magnetic circuit having relatively low magnetic permeability even though such "gap" may be occupied by a solid substance rather than air. These gaps may thus be considered as gaps in the magnetic circuits or magnetic gaps.

Alhough there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A stereophonic phonograph pickup comprising a first and a second magnetic circuit means for reproducing a first and a second sound channel, respectively; each of said magnetic circuit means including asource of magnetic flux; an armature common to said first and said second magnetic circuit means; said first magnetic circuit means including a first pole face means and first magnetic gap means between said first pole face means and said armature; said second magnetic circuit means including a second pole face means and second magnetic gap means between said second pole face means and said armature, a stylus mounted to said armature and positioned forwardly of one end thereof, resilient means mounting said armature for oscillatory movement to vary passage of magnetic flux in both of said gap means responsive to movement of said stylus; first and second pickup means coupled to said first and said second magnetic circuits, respectively, for detecting changes in flux in said respective magnetic circuit means due to changes of magnetic flux in said gaps means of said respective magnetic circuit means; said armature having a conical portion at the other end thereof tapering rearward.

2. A phonograph pickup as in claim 1 in which the armature is constructed of material having relatively high magnetic permeability and said source of magnetic flux is a stationary permanent magnet.

3. A phonograph pickup as in claim 1 in which the armature is an elongated member; said conical portion formed about the longitudinal axis of said member.

4. A phonograph pickup as in claim 3 in which the armature also includes a cylindrical portion forward of said conical portion.

4. A phonograph pickup as in claim 2 in which the armature is cylindrical.

5. A stereophonic phonograph pickup comprising, first and a second magnetic circuit means for reproducing a first and a second sound channel, respectively; a moving system including a magnetic flux permeable armature common to said first and second magnetic circuit means; said first magnetic circuit means including a first pole face means and first magnetic gap means between said first pole face means and said armature; said second magnetic circuit means including second pole face means and second magnetic gap means between said second pole face means and said armature; magnetizing means in said first and second magnetic circuit means forcing magnetic flux from said respective pole face means across said respective gap means; said moving system also including a stylus connected to said armature and positioned forwardly of one end thereof; resilient means mounting said armature for oscillatory movement during wrich passage of magnetic flux across both of said gap means varies responsive to motion of said stylus; first and second winding pickup means coupled to said first and said second magnetic circuits, respectively, for producing signals corresponding to flux changes in said respective magnetic circuit means due to changes of magnetic flux in said gap means of said respective magnetic circuit means; a permeable magnetic shield surrounding at least part of said first and second magnetic circuit means including their said respective pole faces and having an opening through which said moving system projects with said stylus positioned forward of said opening; said opening defined by a shield edge closely spaced by a non-magnetic third gap means from said one end of said armature; said magnetizing means also forcing said magnetic flux through said armature and across said third gap means to return said magnetic shield to said first and second pole force means.

6. A phonograph pickup as set forth in claim 5 in which said armature extends forward from said first and second gap means at least as far as said third gap means.

7. A phonograph pickup as set forth in claim 5 in which said moving system is insertable into and removable from operative position with respect to said first, second, and third gap means by movement through said opening in said magnetic shield.

8. A phonograph pickup as in claim 5 in which the first and second gap means are coextensive and form a common gap positioned at the other end of said armature while said third gap means is positioned at the first end of said armature.

9. A phonograph pickup as set forth in claim 8 in said armature includes a section tapering rearward and being symmetrical with respect to mutually perpendicular axes positioned perpendicular to a central axis of said armature extending from front to rear of said armature.

10. A phonograph pickup as in claim 8 in which the resilient means includes a cantilever spring; a sleeve wherein said armature is disposed; one end of said spring mounted to said sleeve and the other end of said spring mounted to said armature; said armature having a longitudinal passage along the longitudinal axis of said armature, said other end of said spring extending into said passage.

11. A phonograph pickup as set forth in claim 10 in which the spring extends generally along the longitudinal axis to a point of said sleeve to the rear of the armature other end.

12. A phonograph pickup as set forth in claim 11 having an elastomeric damping member engaging said armature forward of said conical portion.

13. A phonograph pickup as in claim 8 in which said armature includes a conical portion formed about an axis of said armature extending from front to rear thereof; second conical portion tapering rearward; said first and said second pole face means each having opposed first and second arcuate sections; said first sections and said second sections positioned in a circular array surrounding said conical portion with said first section of said first pole face means interposed between said first and said second sections of said second pole face means.

14. A phonograph pickup as in claim 13 in which the armature also includes a cylindrical portion formed about said axis and positioned forward of said conical portion.

15. A replaceable stylus assembly for an electromagnetic phonograph pickup comprising at least two distinct pole pieces having at least two spaced-apart pole faces bounding an air gap; said stylus assembly including a tubular support member shaped for insertion and mounting within said air-gap; a magnetic armature within said support member; a spring connecting said armature to said support member; an elastomeric damping means interposed between said armature and said support member in engagement with both; a stylus; an arm connected at one end to said stylus, connected at the other end to one end of said armature, and extending forward therefrom; said armature including a rearwardly tapering portion formed about a front to rear axis of said armature and symmetrical with respect to mutually perpendicular axes extending through and perpendicular to said front to rear axes.

16. A replaceable stylus assembly as in claim 15 in which the spring is an elongated member extending in the direction of the front to back axis with one end of the spring secured to said support member and the other end of the spring extending into the armature through an end thereof.

17. A replaceable stylus assembly as in claim 16 in which the arm extends into the armature through the end thereof opposite said spring and is connected directly to the spring.

18. A replaceable stylus assembly as set forth in claim 15 in which said tapering portion is conical.

19. A replaceable stylus assembly as set forth in claim 18 in which said armature also includes a cylindrical portion formed about said front to rear axis and positioned forward of said tapering portion.

20. A replaceable stylus assembly as set forth in claim 19 in which said damping means engages said armature forward of said tapering portion.

21. A replaceable stylus as set forth in claim 19 in which said armature is an elongated tubular member having a circularly cross-sectioned passage extending from end to end thereof.

22. A stereophonic phonograph pickup comprising a first and a second magnetic circuit means for reproducing a first and a second sound channel, respectively; each of said magnetic circuit means including a source of magnetic flux; an armature common to said first and said second magnetic circuit means; said first magnetic circuit means including a first pole face means and first magnetic gap means between said first pole face means and said armature; said second magnetic circuit means including a second pole face means and second magnetic gap means between said second pole face means and said armature, a stylus mounted to said armature and positioned forwardly of one end thereof, resilient means mounting said armature for oscillatory movement to vary passage of magnetic flux in both of said gaps means responsive to movement of said stylus; first and second pickup means coupled to said first and said second magnetic circuits, respectively, for detecting changes in flux in said respective magnetic circuit means due to changes of magnetic flux in said gaps means of said respective magnetic circuit means; said armature having a tapered portion at the other end thereof; said armature being an elongated tubular member; said tapered portion formed about the longitudinal axis of said tubular member; a magnetic shield housing common to both said first and said second magnetic circuit means; said armature disposed within said housing and spaced therefrom by a third magnetic gap means bounded by a portion of said housing providing an edge defining an aperture in said housing.

23. A replaceable stylus assembly for an electromagnetic phonograph pickup comprising at least two distinct pole pieces having at least two spaced-apart pole faces bounding a first air gap, and magnetic shield means having an opening defining another air gap positioned forward of said first air gap; said stylus assembly including a tubular support member shaped for insertion and mounting within both of said air gaps; a moving system including an armature within said support member; a spring connecting said armature to said support member for controlled oscillatory motion; said moving system also including an elongated magnetically permeable armature long enough to extend between said first and said another air gaps; said moving system further including an arm connected at one end to said stylus, connected at the other end to one end of said armature, and extending forward therefrom; a bridge extending over said stylus and adapted to be manually engageable for insertion and removal of said stylus assembly; said bridge having an aperture closely fitted to said support member; said moving system extending through said aperture with said stylus positioned forward of said aperture, said one end of said armature extending into said aperture, and the other end of said armature positioned to the rear of said aperture.

24. A replaceable stylus assembly as set forth in claim 23 in which said armature comprises a tubular member; said arm extending into said armature at the forward end thereof; said spring comprises an elongated cantilever member extending into said armature at the rear end thereof and connected directly to said arm.

25. A phonograph pickup as set forth in claim 5 in which each of said first and second magnetic circuit means includes at least two laterally spaced elongated pole members spaced laterally from surrounding wall portions of said magnetic shield; said first pole face means being at one end of said pole members of said first magnetic circuit means and said second pole face means being at one end of said pole members of said second magnetic circuit means; said magnetizing means forcing said magnetic flux through the lengths of said pole members of both said first and second magnetic circuit means.

References Cited

UNITED STATES PATENTS

| | | | |
|---|---|---|---|
| 3,060,281 | 10/1962 | Snepvangers | 179—100.41 |
| 2,622,156 | 12/1952 | Baker | 179—100.41 |
| 2,864,897 | 12/1958 | Kaar | 179—100.41 |
| 3,067,295 | 12/1962 | Stanton | 179—100.41 |
| 3,146,319 | 8/1964 | Stanton | 179—100.41 |

FOREIGN PATENTS 909,992 11/1962 Great Britain.

BERNARD KONICK, Primary Examiner

RAYMOND F. CARDILLO, Jr., Assistant Examiner

U.S. Cl. X.R.

274—37